US011275606B2

(12) United States Patent
Shulman et al.

(10) Patent No.: US 11,275,606 B2
(45) Date of Patent: Mar. 15, 2022

(54) PRIORITY BASED MANAGEMENT OF ACCESS TO SHARED RESOURCES

(71) Applicant: Mobileye Vision Technologies Ltd., Jerusalem (IL)

(72) Inventors: Boris Shulman, Holon (IL); Itamar Richter, Nehusha (IL); Galit Keret, Jerusalem (IL)

(73) Assignee: Mobileye Vision Technologies Ltd., Jerusalem (IL)

(*) Notice: Subject to any disclaimer, the term of this patent is extended or adjusted under 35 U.S.C. 154(b) by 0 days.

(21) Appl. No.: 16/981,179

(22) PCT Filed: Mar. 6, 2020

(86) PCT No.: PCT/US2020/021564
§ 371 (c)(1),
(2) Date: Sep. 15, 2020

(87) PCT Pub. No.: WO2020/185623
PCT Pub. Date: Sep. 17, 2020

(65) Prior Publication Data
US 2021/0157634 A1 May 27, 2021

Related U.S. Application Data
(60) Provisional application No. 62/815,389, filed on Mar. 8, 2019.

(51) Int. Cl.
*G06F 9/46* (2006.01)
*G06F 9/48* (2006.01)
(Continued)

(52) U.S. Cl.
CPC ......... *G06F 9/4818* (2013.01); *B60W 60/001* (2020.02); *G06N 3/08* (2013.01)

(58) Field of Classification Search
CPC ....... G06F 9/4818; B60W 60/001; G06N 3/08
See application file for complete search history.

(56) References Cited

U.S. PATENT DOCUMENTS 7,020,161 B1 * 3/2006 Eberle ................ H04J 3/22
370/395.2
2003/0177296 A1 9/2003 Kurth
(Continued)

FOREIGN PATENT DOCUMENTS

CN 112219197 A 1/2021
JP 2005216308 8/2005
(Continued)

OTHER PUBLICATIONS

"International Application Serial No. PCT/US2020/021564, International Search Report dated Jul. 7, 2020", 4 pgs.
(Continued)

*Primary Examiner* — Tammy E Lee
(74) *Attorney, Agent, or Firm* — Schwegman Lundberg & Woessner, P.A.

(57) ABSTRACT

A system, computer readable medium and a method that may include performing multiple iterations of: determining, by each active initiator of the multiple initiators, a number of pending access requests generated by the active initiator, wherein each access request is a request to access a shared resource out of the shared resources; determining, by each active initiator, a priority level to be assigned to all pending access requests generated by the active initiator, wherein the determining is based on the number of pending access requests generated by the active initiator, a number of active initiators out of the multiple initiators, and a number of access requests serviceable by the shared resource; for each active initiator, informing an arbitration hardware of a network on chip about the priority level to be assigned to all pending access requests generated by the active initiator;
(Continued)

and managing access to the shared resources, by the arbitration hardware, based on the priority level to be assigned to all pending access requests generated by each active initiator.

15 Claims, 12 Drawing Sheets

(51) Int. Cl.
  *B60W 60/00* (2020.01)
  *G06N 3/08* (2006.01)

(56) References Cited

U.S. PATENT DOCUMENTS

| | | | |
|---|---|---|---|
| 2005/0165987 | A1 | 7/2005 | Asano et al. |
| 2009/0259705 | A1* | 10/2009 | Kailas ............... G06F 13/14 |
| | | | 708/255 |
| 2014/0047148 | A1 | 2/2014 | Mace |
| 2014/0373021 | A1* | 12/2014 | Teixeira ............ G06F 9/5038 |
| | | | 718/103 |
| 2018/0143907 | A1* | 5/2018 | Clifton ............. G06F 12/0848 |
| 2020/0175428 | A1* | 6/2020 | Mercay ............... G06Q 10/02 |

FOREIGN PATENT DOCUMENTS

| | | |
|---|---|---|
| JP | 2007026022 | 2/2007 |
| JP | 2011059915 | 3/2011 |
| JP | 2011065649 | 3/2011 |
| KR | 20060008908 A | 1/2006 |
| WO | WO-2018193448 A1 | 10/2018 |
| WO | WO-2020185623 A1 | 9/2020 |

OTHER PUBLICATIONS

"International Application Serial No. PCT/US2020/021564, Written Opinion dated Jul. 7, 2020", 5 pgs.

"Japanese Application Serial No. 2020-567803, Notification of Reasons for Refusal dated Jul. 6, 2021", w English Translation, 7 pgs.

"Japanese Application Serial No. 2020-567803, Response filed Oct. 5, 2021 to Notification of Reasons for Refusal dated Jul. 6, 2021", w English claims, 10 pgs.

* cited by examiner

| Q | Start of Range (R_low) | End of Range (R_high) |
|---|---|---|
| 0 | 7*R/M/(L-1) | |
| 1 | 6*R/M/(L-1) | 7*R/M/(L-1)-1 |
| 2 | 5*R/M/(L-1) | 6*R/M/(L-1)-1 |
| 3 | 4*R/M/(L-1) | 5*R/M/(L-1)-1 |
| 4 | 3*R/M/(L-1) | 4*R/M/(L-1)-1 |
| 5 | 2*R/M/(L-1) | 3*R/M/(L-1)-1 |
| 6 | 1*R/M/(L-1) | 2*R/M/(L-1)-1 |
| 7 | 0*R/M/(L-1) | 1*R/M/(L-1)-1 |

500

| Q | Start of Range (R_low) | End of Range (R_high) | Use when |
|---|---|---|---|
| 0 | 64 | | $64 \leq T$ |
| 1 | 54 | 63 | $54 \leq T \leq 63$ |
| 2 | 45 | 53 | $45 \leq T \leq 53$ |
| 3 | 36 | 44 | $36 \leq T \leq 44$ |
| 4 | 27 | 35 | $27 \leq T \leq 35$ |
| 5 | 18 | 26 | $18 \leq T \leq 26$ |
| 6 | 9 | 17 | $9 \leq T \leq 17$ |
| 7 | 0 | 8 | $0 \leq T \leq 8$ |

PRIORITY BASED MANAGEMENT OF ACCESS TO SHARED RESOURCES

CLAIM OF PRIORITY

This patent application is a U.S. National Stage Filing under 35 U.S.C. 371 from International Application No. PCT/US2020/021564, filed on Mar. 6, 2020, which claims the benefit of priority to U.S. Patent Application Ser. No. 62/815,389, filed on Mar. 8, 2019, all of which are incorporated herein by reference in their entirety.

BACKGROUND

In a modern Network-On-Chip (NOC) multiple initiators (central processing units (CPUs), graphic processing units (GPUs), accelerators, etc.) compete for shared resources. Examples of shared resources include memory units and peripherals. Examples of memory units include double data rate (DDR) memory units and synchronous random access memory (SRAM) units. An example of a shared resource that differs from a memory unit is a communication port such as a Peripheral Component Interconnect Express (PCIe) port and the like.

In systems that include up to a few initiators (such as up to 4 initiators) (hereinafter "small systems") it is easy to identify bandwidth and latency requirements for each initiator and manage access to the shared resources by applying a static QOS (Quality Of Service) scheme to satisfy the requirements.

In big systems (for example, systems that have more than a few initiators—such as more than 4 initiators) in which multiple initiators are running with context switches, the QOS settings should be updated on-the-fly.

The update may be responsive to various parameters of the initiators. In systems that have many initiators the feeding of these parameters to the arbitrators that maintain the QOS settings, may require routing a large number of wires (some of which may be relatively long) from each initiator to an arbitration hardware—which may introduce timing problems and complicate the system. A long wire is a wire that has a latency that exceeds a predefined latency.

There is a growing need to provide an efficient system and method for managing access to shared resources.

SUMMARY

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description may be not limited to the disclosed embodiments and examples.

Disclosed embodiments provide systems and methods that can be used as part of or in combination with autonomous navigation/driving or driver assist technology features. Driver assist technology refers to any suitable technology to assist drivers in the navigation or control of their vehicles, such as forward collision warning (FCW), lane departure warning (LDW) and traffic sign recognition (TSR), as opposed to fully autonomous driving.

There may be provided a system, method, and a non-transitory computer readable medium for managing access to shared resources.

BRIEF DESCRIPTION OF THE DRAWINGS

The accompanying drawings, which are incorporated in and constitute a part of this disclosure, illustrate various disclosed embodiments. In the drawings:

FIG. 5 illustrates priority level tables consistent with the disclosed embodiments;

DETAILED DESCRIPTION

Before discussing in detail examples of features of the error correction coding and memory management of a dynamic memory module of a system that may provide a variety of features related to autonomous driving, semi-autonomous driving, or driver assist technology.

The system may be arranged to process images of an environment ahead of a vehicle navigating a road for training a neural networks or deep learning algorithms to estimate a future path of a vehicle based on images or feature of the processing of images of an environment ahead of a vehicle navigating a road using a trained neural network to estimate a future path of the vehicle.

There may be provided various possible implementations and configurations of a vehicle mountable system that can be used for carrying out and implementing the methods according to examples of the presently disclosed subject matter. In some embodiments, various examples of the system can be mounted in a vehicle and can be operated while the vehicle is in motion. In some embodiments, the system can implement the methods according to examples of the presently disclosed subject matter.

Figure 1:
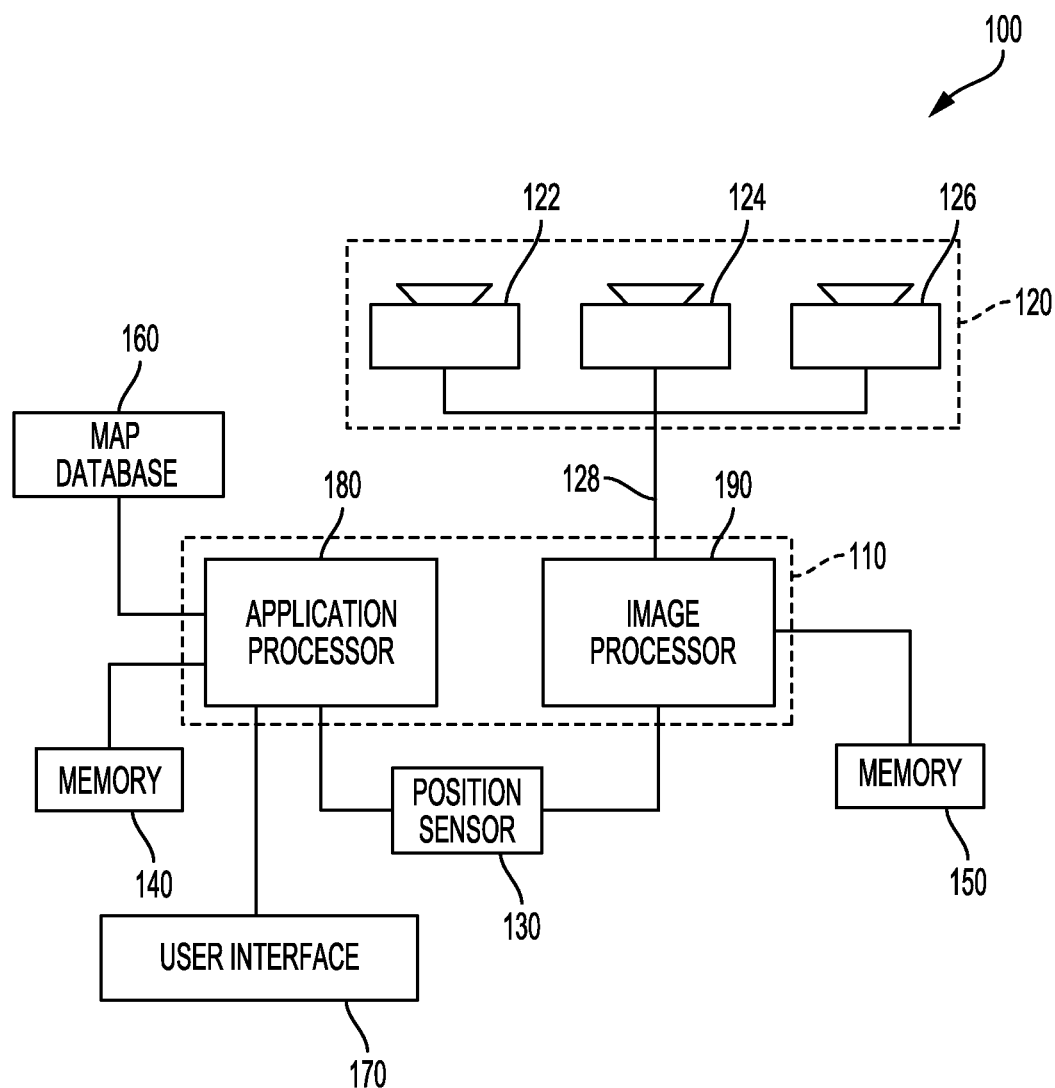
FIG. 1 is a block diagram representation of a system consistent with the disclosed embodiments.

FIG. 1, to which reference is now made, is a block diagram representation of a system 100 consistent with the disclosed embodiments. System 100 can include various components depending on the requirements of a particular implementation. In some examples, system 100 can include a processing unit 110, an image acquisition unit 120, and one or more memory units 140, 150. Processing unit 110 can include one or more processing devices. In some embodiments, processing unit 110 can include an application processor 180, an image processor 190, or any other suitable processing device. Similarly, image acquisition unit 120 can include any number of image acquisition units and components depending on the requirements of a particular application. In some embodiments, image acquisition unit 120 can include one or more image capture devices (e.g., cameras), such as image capture device 122, image capture device 124, and image capture device 126. In some embodiments, system 100 can also include a data interface 128 communicatively connecting processing unit 110 to image acquisition unit 120. For example, data interface 128 can include any wired or wireless link (or multiple links) for transmitting image data acquired by image acquisition unit 120 to processing unit 110.

Both application processor 180 and image processor 190 can include various types of processing devices. For example, either or both of application processor 180 and image processor 190 can include one or more microprocessors, preprocessors (such as image preprocessors), graphics processors, central processing units (CPUs), support circuits, digital signal processors, integrated circuits, memory, or any other types of devices suitable for running applications and for image processing and analysis. In some embodiments, application processor 180 or image processor 190 can include any type of single or multi-core processor, mobile device microcontroller, central processing unit, etc. Various processing devices can be used, including, for example, processors available from manufacturers such as Intel®, AMD®, etc. and can include various architectures (e.g., x86 processor, ARM®, etc.).

In some embodiments, application processor 180 or image processor 190 can include any of the EyeQ series of processor chips available from Mobileye®. These processor designs each include multiple processing units with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture has two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP™ and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third-generation processor and is six times more powerful that the EyeQ2®, may be used in the disclosed examples. In yet another example, the EyeQ4®, the fourth-generation processor, may be used in the disclosed examples.

While FIG. 1 depicts two separate processing devices included in processing unit 110, more or fewer processing devices can be used. For example, in some examples, a single processing device may be used to accomplish the tasks of application processor 180 and image processor 190. In other embodiments, these tasks can be performed by more than two processing devices.

Processing unit 110 can include various types of devices. For example, processing unit 110 may include various devices, such as a controller, an image preprocessor, a central processing unit (CPU), support circuits, digital signal processors, integrated circuits, memory, or any other types of devices for image processing and analysis. The image preprocessor can include a video processor for capturing, digitizing, and processing the imagery from the image sensors. The CPU can include any number of microcontrollers or microprocessors. The support circuits can be any number of circuits generally well known in the art, including cache, power supply, clock, and input-output circuits. The memory can store software that, when executed by the processor, controls the operation of the system. The memory can include databases and image processing software, including a trained system, such as a neural network, for example. The memory can include any number of random access memories, read only memories, flash memories, disk drives, optical storage, removable storage, and other types of storage. In one instance, the memory can be separate from the processing unit 110. In another instance, the memory can be integrated into the processing unit 110.

Each memory unit 140, 150 can include software instructions that when executed by a processor (e.g., application processor 180 or image processor 190), can control operation of various aspects of system 100. These memory units 140, 150 can include various databases and image processing software. The memory units 140, 150 can include random access memory, read only memory, flash memory, disk drives, optical storage, tape storage, removable storage, or any other types of storage. In some examples, memory units 140, 150 can be separate from the application processor 180 or image processor 190. In other embodiments, these memory units 140, 150 can be integrated into application processor 180 or image processor 190.

In some embodiments, the system can include a position sensor 130. The position sensor 130 can include any type of device suitable for determining a location associated with at least one component of system 100. In some embodiments, position sensor 130 can include a GPS receiver. Such receivers can determine a position and velocity by processing signals broadcasted by global positioning system satellites. Position information from position sensor 130 can be made available to application processor 180 or image processor 190.

In some embodiments, the system 100 can be operatively connectible to various systems, devices and units onboard a vehicle in which the system 100 can be mounted, and through any suitable interfaces (e.g., a communication bus) the system 100 can communicate with the vehicle's systems. Examples of vehicle systems with which the system 100 can cooperate include: a throttling system, a braking system, and a steering system.

In some embodiments, the system 100 can include a user interface 170. User interface 170 can include any device suitable for providing information to or for receiving inputs from one or more users of system 100, including, for example, a touchscreen, microphone, keyboard, pointer devices, track wheels, cameras, knobs, buttons, etc. Information can be provided by the system 100, through the user interface 170, to the user.

In some embodiments, the system 100 can include a map database 160. The map database 160 can include any type of database for storing digital map data. In some examples, map database 160 can include data relating to a position, in a reference coordinate system, of various items, including roads, water features, geographic features, points of interest, etc. Map database 160 can store not only the locations of such items, but also descriptors relating to those items, including, for example, names associated with any of the stored features and other information about them. For example, locations and types of known obstacles can be included in the database, information about a topography of a road or a grade of certain points along a road, etc. In some embodiments, map database 160 can be physically located with other components of system 100. Alternatively or additionally, map database 160 or a portion thereof can be located remotely with respect to other components of system 100 (e.g., processing unit 110). In such embodiments, information from map database 160 can be downloaded over a wired or wireless data connection to a network (e.g., over a cellular network or the Internet, etc.).

Image capture devices 122, 124, and 126 can each include any type of device suitable for capturing at least one image from an environment. Moreover, any number of image capture devices can be used to acquire images for input to the image processor. Some examples of the presently disclosed subject matter can include or can be implemented with only a single-image capture device, while other examples can include or can be implemented with two, three, or even four or more image capture devices. Image capture devices 122, 124, and 126 will be further described with reference to FIGS. 2B-2E, below.

It should be appreciated that the system 100 can include or can be operatively associated with other types of sensors, including for example: an acoustic sensor, a RF sensor (e.g., radar transceiver), and a LIDAR sensor. Such sensors can be used independently of or in cooperation with the image acquisition unit 120. For example, the data from the radar system (not shown) can be used for validating the processed information that is received from processing images acquired by the image acquisition unit 120, e.g., to filter certain false positives resulting from processing images acquired by the image acquisition unit 120, or it can be combined with or otherwise compliment the image data from the image acquisition unit 120, or some processed variation or derivative of the image data from the image acquisition unit 120.

Figure 2A:
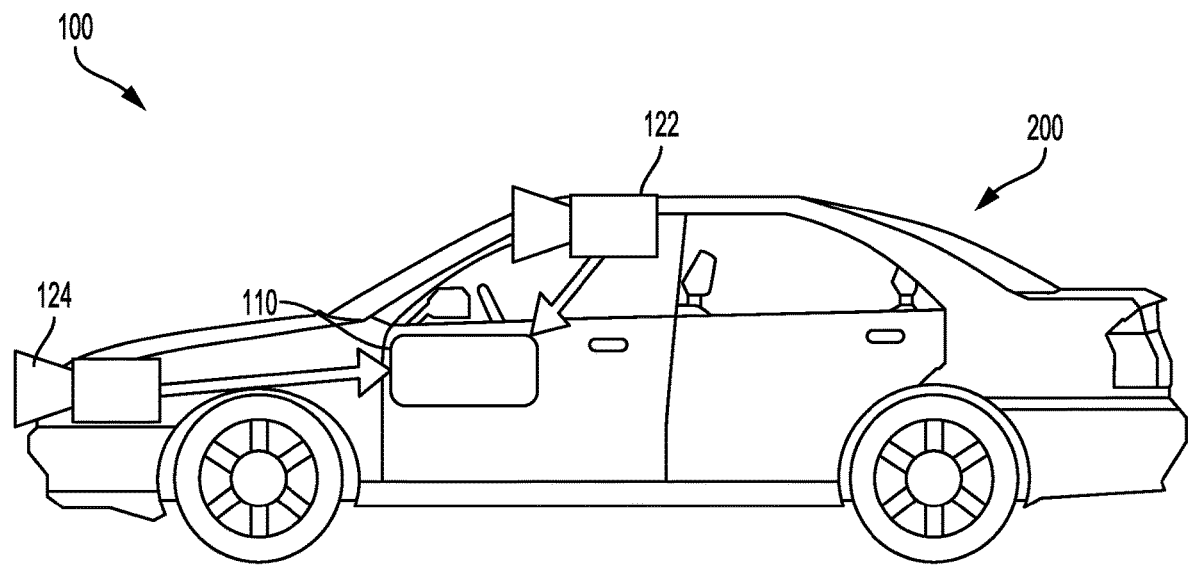
FIG. 2A is a diagrammatic side view representation of an exemplary vehicle including a system consistent with the disclosed embodiments.

System 100, or various components thereof, can be incorporated into various different platforms. In some embodiments, system 100 may be included on a vehicle 200, as shown in FIG. 2A. For example, vehicle 200 can be equipped with a processing unit 110 and any of the other components of system 100, as described above relative to FIG. 1. While in some embodiments vehicle 200 can be equipped with only a single image capture device (e.g., camera), in other embodiments, such as those discussed in connection with FIGS. 2B-2E, multiple image capture devices can be used. For example, either of image capture devices 122 and 124 of vehicle 200, as shown in FIG. 2A, can be part of an ADAS (Advanced Driver Assistance Systems) imaging set.

The image capture devices included on vehicle 200 as part of the image acquisition unit 120 can be positioned at any suitable location. In some embodiments, as shown in FIGS. 2A-2E and 3A-3C, image capture device 122 can be located in the vicinity of the rearview mirror. This position may provide a line of sight similar to that of the driver of vehicle 200, which can aid in determining what is and is not visible to the driver.

Other locations for the image capture devices of image acquisition unit 120 can also be used. For example, image capture device 124 can be located on or in a bumper of vehicle 200. Such a location can be especially suitable for image capture devices having a wide field of view. The line of sight of bumper-located image capture devices can be different from that of the driver. The image capture devices (e.g., image capture devices 122, 124, and 126) can also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front or back of vehicle 200, etc. The image acquisition unit 120, or an image capture device that is one of a plurality of image capture devices that are used in an image acquisition unit 120, can have a field-of-view (FOV) that is different than the FOV of a driver of a vehicle, and not always see the same objects. In an example, the FOV of the image acquisition unit 120 can extend beyond the FOV of a typical driver and can thus image objects which are outside the FOV of the driver. In yet another example, the FOV of the image acquisition unit 120 is some portion of the FOV of the driver. In some embodiments, the FOV of the image acquisition unit 120 corresponding to a sector which covers an area of a road ahead of a vehicle and possibly also surroundings of the road.

In addition to image capture devices, vehicle 200 can be include various other components of system 100. For example, processing unit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

Figure 2B:
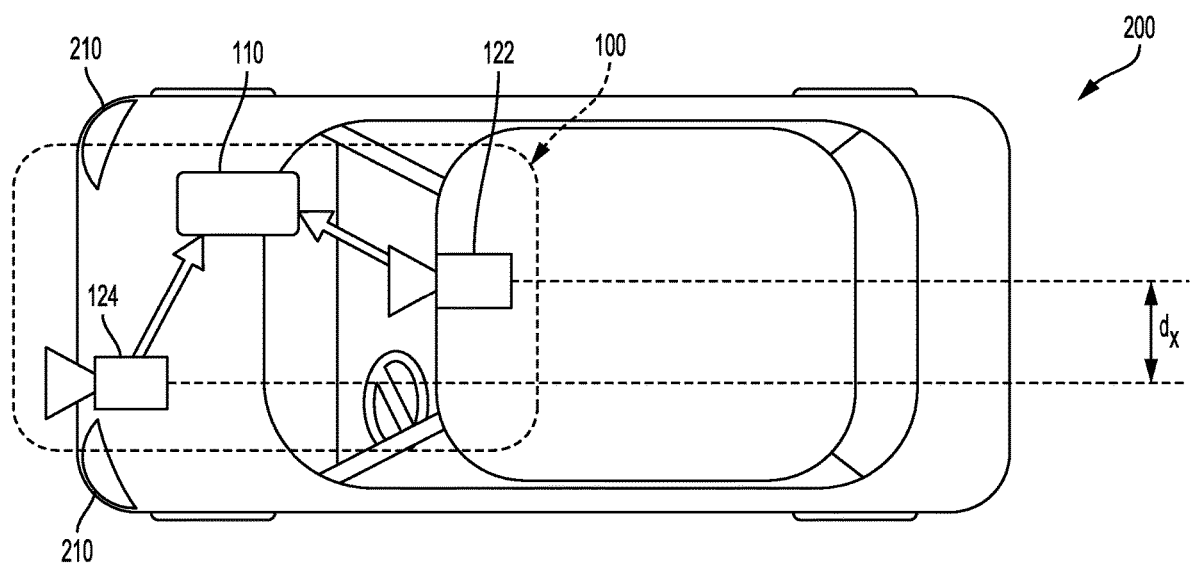
FIG. 2B is a diagrammatic top view representation of the vehicle and system shown in FIG. 2A consistent with the disclosed embodiments.

FIG. 2A is a diagrammatic side view representation of a vehicle imaging system according to examples of the presently disclosed subject matter. FIG. 2B is a diagrammatic top view illustration of the example shown in FIG. 2A. As illustrated in FIG. 2B, the disclosed examples can include a vehicle 200 including in its body a system 100 with a first image capture device 122 positioned in the vicinity of the rearview mirror or near the driver of vehicle 200, a second image capture device 124 positioned on or in a bumper region (e.g., one of bumper regions 210) of vehicle 200, and a processing unit 110.

Figure 2C:
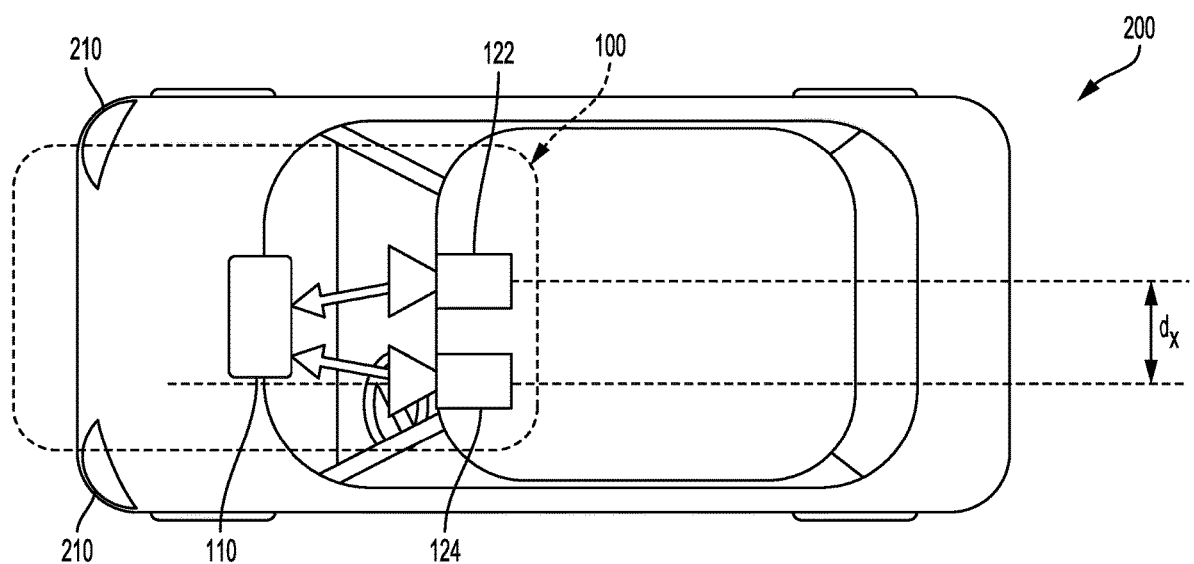
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror or near the driver of vehicle 200. Additionally, while two image capture devices 122 and 124 are shown in FIGS. 2B and 2C, it should be understood that other embodiments may include more than two image capture devices. For example, in the embodiment shown in FIG. 2D, first, second, and third image capture devices 122, 124, and 126, are included in the system 100 of vehicle 200.

Figure 2D:
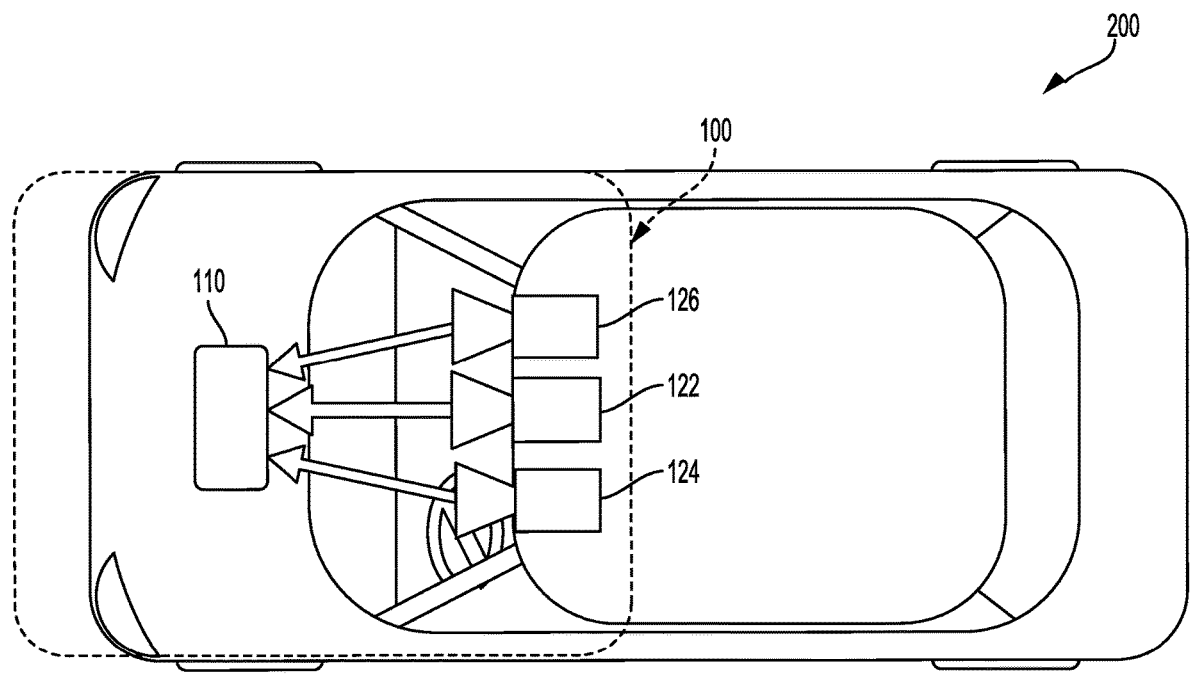
FIG. 2D is a diagrammatic top view representation of yet another embodiment of a vehicle including a system consistent with the disclosed embodiments.

As shown in FIG. 2D, image capture devices 122, 124, and 126 may be positioned in the vicinity of the rearview mirror or near the driver seat of vehicle 200. The disclosed examples are not limited to any particular number and configuration of the image capture devices, and the image capture devices may be positioned in any appropriate location within or on vehicle 200.

It is also to be understood that disclosed embodiments are not limited to a particular type of vehicle 200 and may be applicable to all types of vehicles including automobiles, trucks, trailers, motorcycles, bicycles, self-balancing transport devices and other types of vehicles.

The first image capture device 122 can include any suitable type of image capture device. Image capture device 122 can include an optical axis. In one instance, the image capture device 122 can include an Aptina M9V024 WVGA sensor with a global shutter. In another example, a rolling shutter sensor can be used. Image acquisition unit 120, and any image capture device which is implemented as part of the image acquisition unit 120, can have any desired image resolution. For example, image capture device 122 can provide a resolution of 1280×960 pixels and can include a rolling shutter.

Image acquisition unit 120, and any image capture device which is implemented as part of the image acquisition unit 120, can include various optical elements. In some embodiments one or more lenses can be included, for example, to provide a desired focal length and field of view for the image acquisition unit 120, and for any image capture device which is implemented as part of the image acquisition unit 120. In some examples, an image capture device which is implemented as part of the image acquisition unit 120 can include or be associated with any optical elements, such as a 6 mm lens or a 12 mm lens, for example. In some examples, image capture device 122 can be arranged to capture images having a desired (and known) field-of-view (FOV).

The first image capture device 122 may have a scan rate associated with acquisition of each of the first series of image scan lines. The scan rate may refer to a rate at which an image sensor can acquire image data associated with each pixel included in a particular scan line.

Figure 2E:
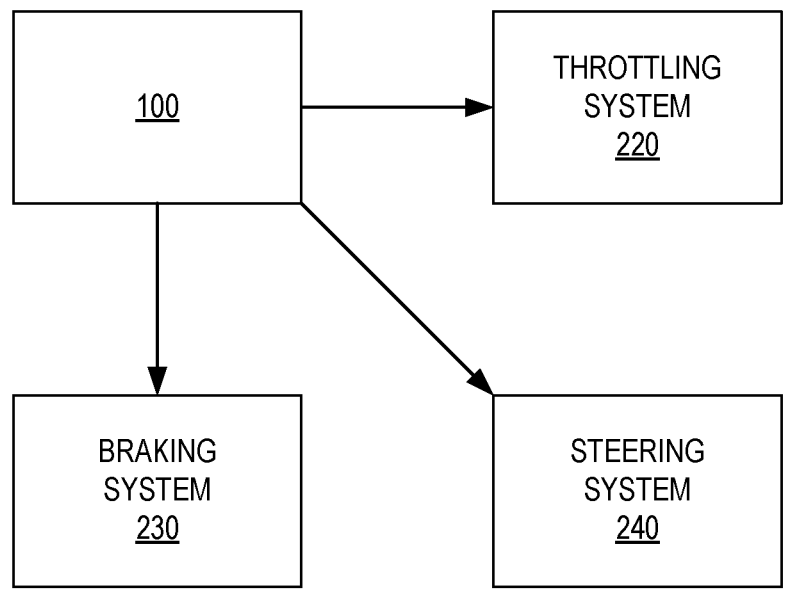
FIG. 2E is a diagrammatic representation of exemplary vehicle control systems consistent with the disclosed embodiments.

FIG. 2E is a diagrammatic representation of vehicle control systems, according to examples of the presently disclosed subject matter. As indicated in FIG. 2E, vehicle 200 can include throttling system 220, braking system 230, and steering system 240. System 100 can provide inputs (e.g., control signals) to one or more of throttling system 220, braking system 230, and steering system 240 over one or more data links (e.g., any wired or wireless link or links for transmitting data). For example, based on analysis of images acquired by image capture devices 122, 124, or 126, system 100 can provide control signals to one or more of throttling system 220, braking system 230, and steering system 240 to navigate vehicle 200 (e.g., by causing an acceleration/deceleration, a turn, a lane shift, etc.). Further, system 100 can receive inputs from one or more of throttling system 220, braking system 230, and steering system 240 indicating operating conditions of vehicle 200 (e.g., speed, whether vehicle 200 is braking or turning, etc.).

Figure 3:
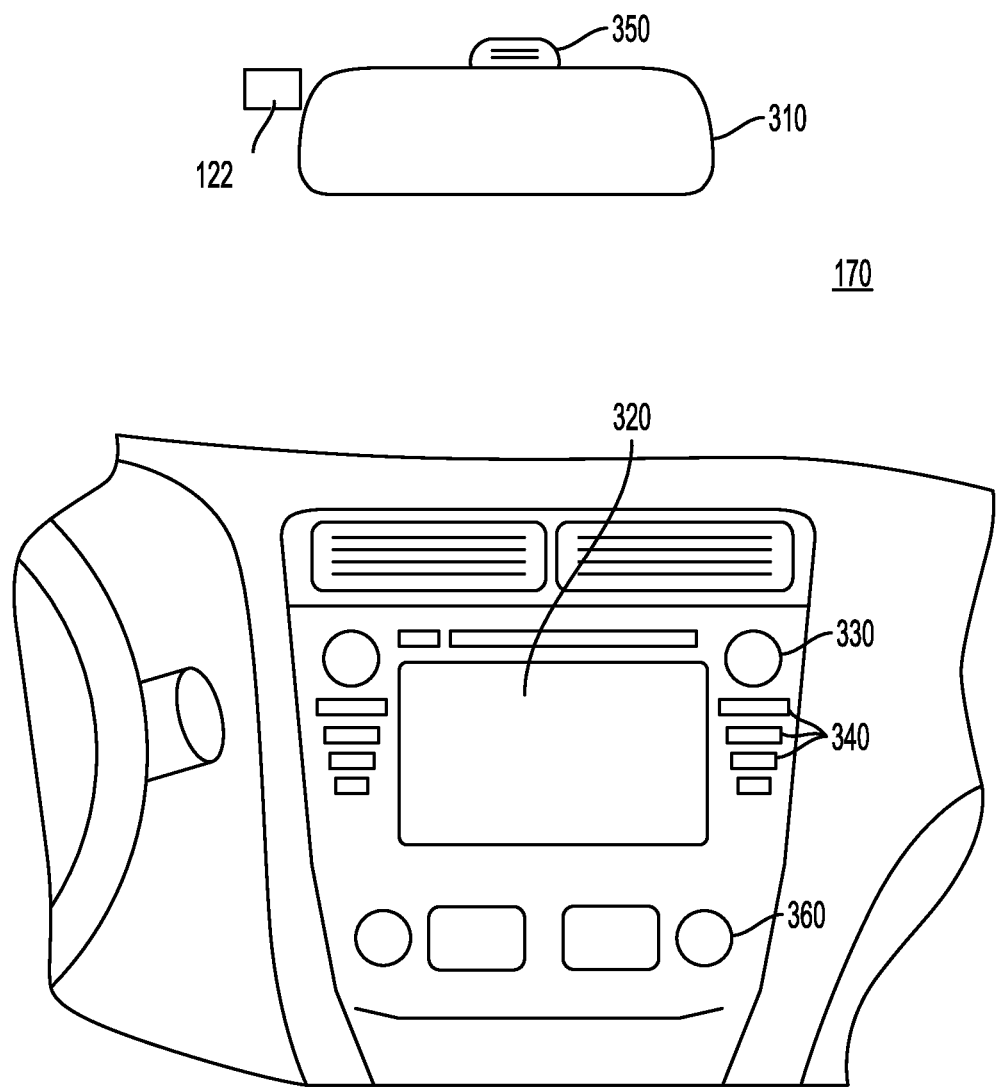
FIG. 3 is a diagrammatic representation of an interior of a vehicle including a rearview mirror and a user interface for a vehicle imaging system consistent with the disclosed embodiments.

As shown in FIG. 3, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

As will be appreciated by a person skilled in the art having the benefit of this disclosure, numerous variations or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and, in response to this analysis, navigate or otherwise control or operate vehicle 200. Navigation, control, or operation of vehicle 200 may include enabling or disabling (directly or via intermediary controllers, such as the controllers mentioned above) various features, components, devices, modes, systems, or subsystems associated with vehicle 200. Navigation, control, or operation may alternately or additionally include interaction with a user, driver, passenger, passerby, or other vehicle or user, which may be located inside or outside vehicle 200, for example by providing visual, audio, haptic, or other sensory alerts or indications.

As discussed below in further detail and consistent with various disclosed embodiments, system 100 may provide a variety of features related to autonomous driving, semi-autonomous driving or driver assist technology. For example, system 100 may analyze image data, position data (e.g., GPS location information), map data, speed data, or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. It would be appreciated that in some cases, the actions taken automatically by the vehicle are under human supervision, and the ability of the human to intervene adjust abort or override the machine action is enabled under certain circumstances or at all times. For example, when vehicle 200 navigates without human intervention, system 100 may automatically control the braking, acceleration, or steering of vehicle 200 (e.g., by sending control signals to one or more of throttling system 220, braking system 230, and steering system 240). Further, system 100 may analyze the collected data and issue warnings, indications, recommendations, alerts, or instructions to a driver, passenger, user, or other person inside or outside of the vehicle (or to other vehicles) based on the analysis of the collected data. Additional details regarding the various embodiments that are provided by system 100 are provided below.

Figure 4A:
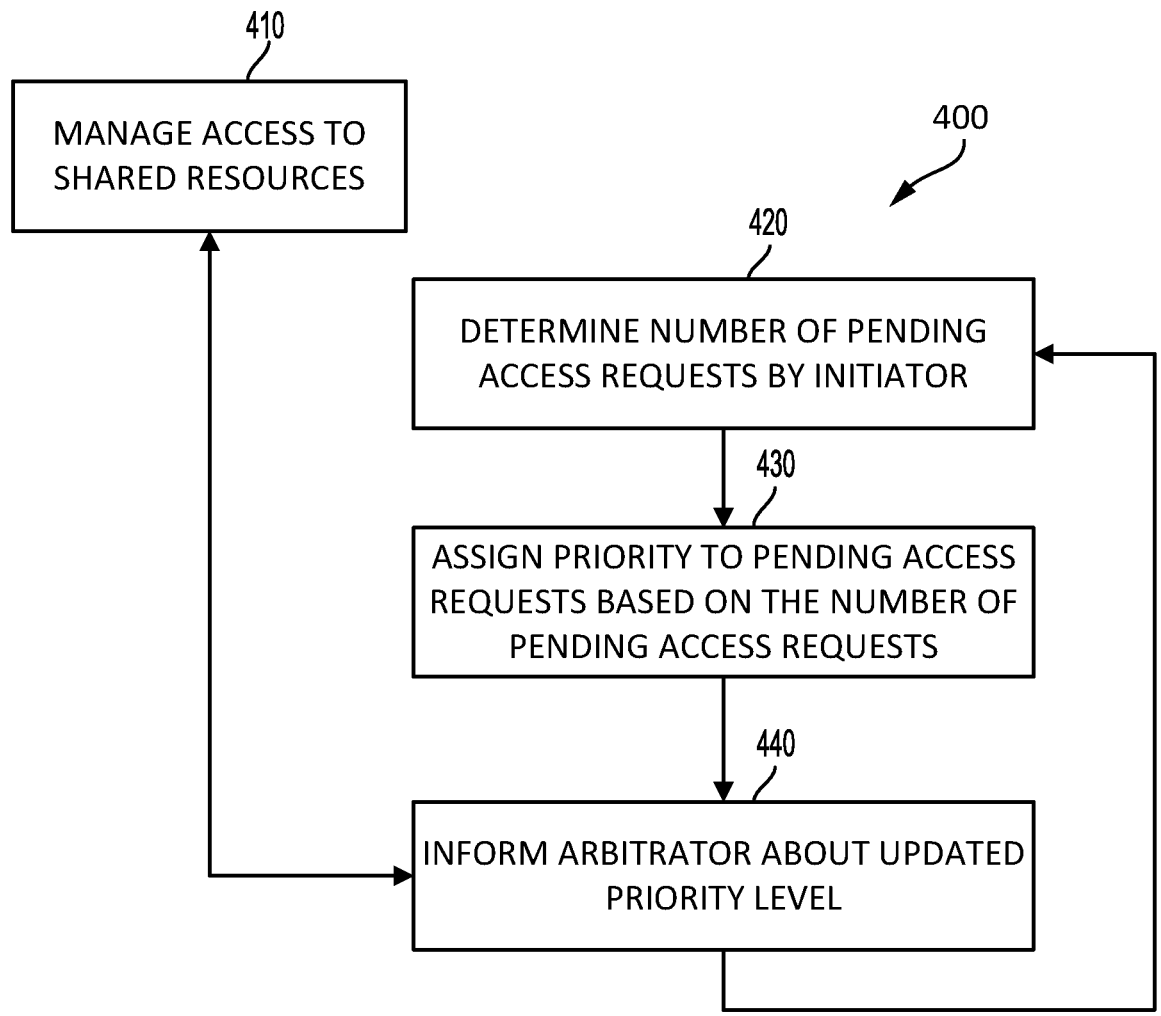
FIG. 4A is an example of a method consistent with the disclosed embodiments.
Figure 4B:
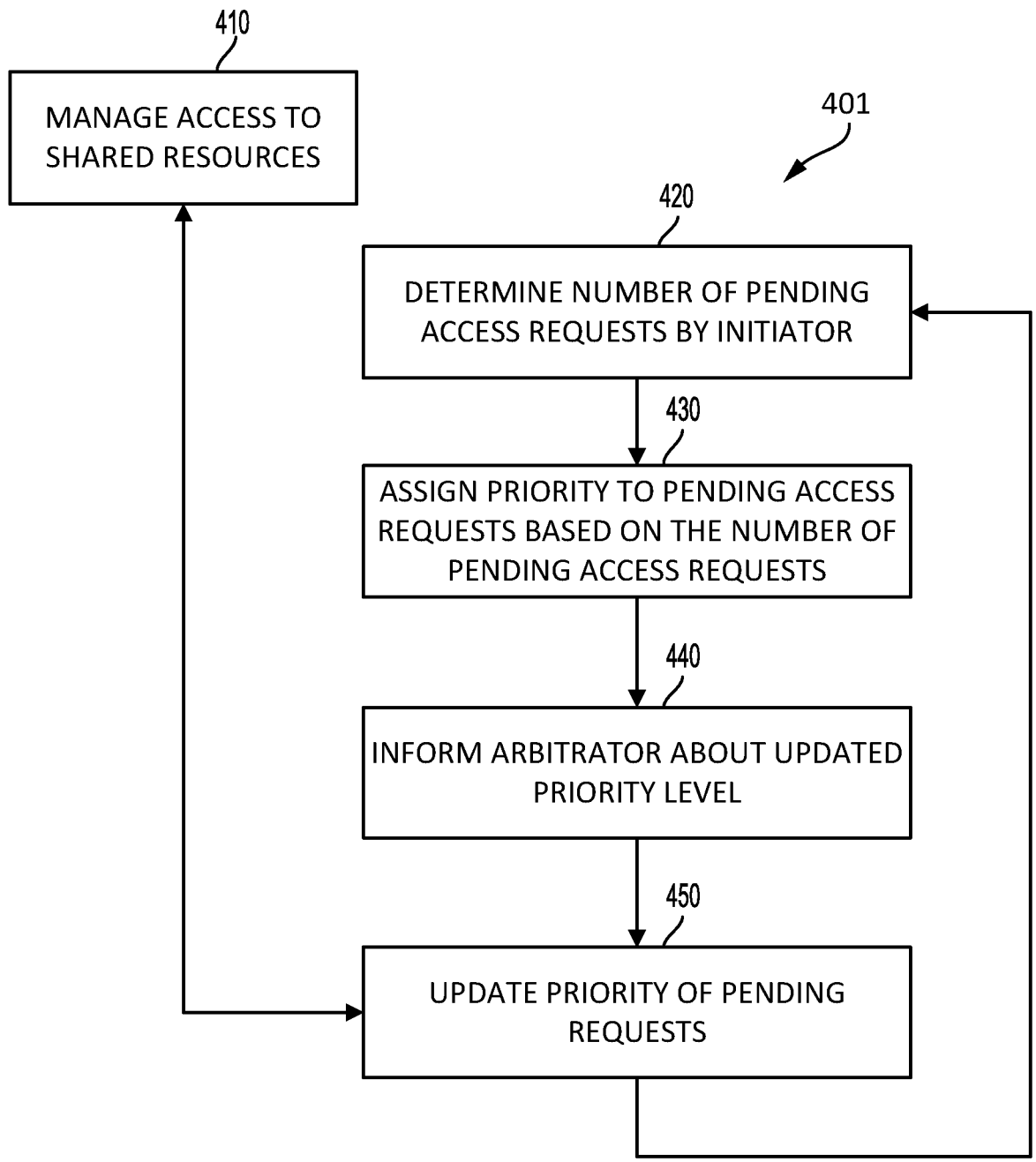
FIG. 4B is an example of a method consistent with the disclosed embodiments.

FIG. 4A illustrates method 400. FIG. 4B illustrates method 401.

Methods 400 and 401 are for managing access of multiple initiators to shared resources.

Method 400 may start by steps 410 and 420.

Step 410 may include managing access to the shared resources, by an arbitration hardware. The access may be managed based on priority levels of pending access requests generated by active initiators.

An active initiator is an initiator that generated at least one access request that is pending during at least a part of a predefined period of time. The predefined period of time may equal a duration of an execution of one or more iterations of steps 420, 430 and 440 (and optionally step 450), or may differ from the duration of execution of one or more iterations of steps 420, 430 and 440 (and optionally step 450).

Any priority based arbitration may be applied. For example, step 410 may apply a round robin arbitration process, a daisy chain arbitration process, a random arbitration process, a weighted round robin arbitration process, a pseudo random arbitration process, a priority based arbitration process, a priority based round robin arbitration process takes into account only access requests of a highest priority level out of the pending access requests.

The arbitration hardware may receive, from time to time, updates to the priority levels of pending access requests and update the priority accordingly.

Thus, method 400 may involve updating the priority of an access requests that were previously received with another priority level.

For example, assuming that an initiator sent a first access request with a first priority (the first access request was sent while they are only few pending access requests). While the first access request is still pending—the initiator sent more access requests—so that a later point in time there are many more pending access requests. Under these assumptions— the priority of the first access request will be lowered (at about the later point of time) to reflect that currently there are many pending access requests related to the initiator. As a result, a greedy initiator that causes many access requests to shared resources is deprioritized and its access requests are given a lower priority level so that other initiators may be serviced in a more equitable manner.

Step 420 may include determining, by each active initiator of the multiple initiators, a number of pending access requests generated by the active initiator, wherein each access request is a request to access a shared resource out of the shared resources.

Step 420 may be followed by step 430 of determining, by each active initiator, a priority level to be assigned to all pending access requests generated by the active initiator.

This priority level should be applied to each pending access request generated by the initiator.

The determining is based on the number of pending access requests generated by the active initiator, a number of active initiators, and a number of access requests serviceable by the shared resources. Each shared resource may have a maximal capacity to serve access requests and may service, at different points of time, a different number of initiators— so that at the different point of time it may service a variable number of access requests.

The shared resources or any other unit or component may determine the access requests serviceable by the shared resources.

Step 430 may include assigning higher priority to access requests (related an initiator), where such access requests were generated when there were lower numbers of pending access requests from the initiator. Priority may be stored as a priority level, which in an embodiment is a numerical score in a range with higher numbers being higher priority and lower numbers indicating lower priority. As such, for example, a priority may be measured using a range of 0 to 7, with priority level 0 being the lowest priority and priority level 7 being the highest.

There may be a plurality of priority levels (L) of access requests. L is an integer that exceeds one. As such, L represents the number of available priority levels in the system. In a system that uses a 3-bit field to represent the priority level, the maximum number of priority levels is 8, and L may be set to 8. With a 4-bit field, the maximum number of priority levels that may be enumerated is 16, so depending on how the system is configured, the number of priority levels in use (L) may be set as low as 2 or as high as 16.

Step 430 may include determining an effective priority level out of the L priority levels based on the number of active initiators and the number of requests that shared resources are able to service.

Each one of the plurality of priority levels is associated with a range of values of pending access requests.

Step 430 may include searching for a range of values that includes the number of pending access requests generated by the active initiator.

For each priority level (Q), the range of numbers corresponding to a priority level may start by a value that substantially equals $(L-1-Q)*R/M/(L-1)$.

1. R is the number of the access requests serviceable by the shared resources (serviceable concurrently or serviceable within a single cycle of steps 420, 430 and 440).
2. M is the number of currently active initiators of the multiple initiators.

For each priority level (Q) the range of numbers may end at a value that substantially equals $(L-Q)*R/M/(L-1)-1$.

Substantially equals may include a deviation of up to 5%, 10%, and the like.

Step 430 may be followed by step 440 of informing, by each active initiator, an arbitration hardware of a network on chip about the priority level to be assigned to all pending access requests generated by the active initiator.

Each active initiator is associated with at least one arbitration unit of the arbitration hardware. For each active initiator, step 440 may include informing the at least one arbitration unit about the priority level to be assigned to all pending access requests generated by the active initiator.

FIG. 4A illustrates that step 440 may be followed by step 420 to iterate through the steps 420, 430, and 440 again.

FIG. 4B illustrates that step 440 may be followed by step 450. Step 450 may be followed by step 420 to iterate through steps 420, 430, and 440 again.

Step 450 may include responding to the informing.

Step 450 may be executed by the arbitration hardware, by the initiators, and the like.

Step 450 may include updating, by the arbitration hardware of the network of chip the priority level to be assigned to all pending access requests generated by the active initiator.

The updating may involve changing a priority level of at least pending access requests that was pending before the current iteration of step 440.

For example, if the number of pending access requests from the active initiator has increased (at least by an amount that requires a lowering of priority level) between the current iteration of step 440 and the previous iteration of step 440—the updating may include lowering the priority level of the pending access requests from the active initiator.

In another example, if the number of pending access requests from the active initiator has decreased (at least by an amount that requires an increase of priority level) between the current iteration of step 440 and the previous iteration of step 440—the updating may include increasing the priority level of the pending access requests from the active initiator.

Step 450 may be followed by step 410, during which the method may perform an arbitration between access requests from one or more active initiators. The arbitrating is made based, at least in part, on the priority levels of the access requests.

Method 400 allows multiple iterations of steps 420, 430 and 440 to be executed during an execution of step 410.

Method 401 allows multiple iterations of steps 420, 430, 440 and 450 to be executed during an execution of step 410.

Method 400 or method 401 may be executed by an advanced driver assistance system or by an autonomous driving system.

The multiple initiators may be CPUs, GPUs, peripherals, sensors, and the shared resources may be memory modules, computational resources, and the like.

FIG. 5 is an example of first table 500 and a second table 502.

The first table 500 illustrates the various start points and end points for eight priority levels. The second table 502 illustrates the various start points and end points for eight priority levels and for certain values of R, M, and L. In table 502, when the number of requests from an initiator (T) is between 36 and 44, then a priority level (Q) of 3 is assigned. As the number of requests (T) increases, the priority level (Q) is decreased.

Figure 6:
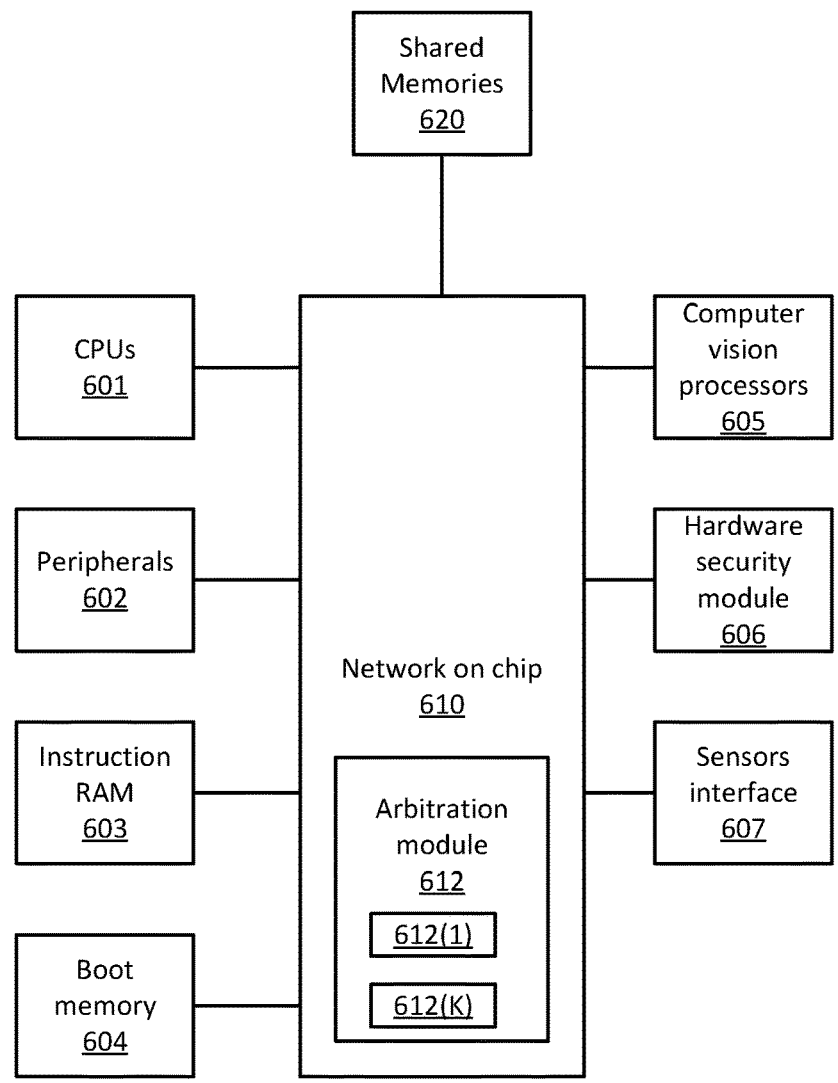
FIG. 6 illustrates a part of a system consistent with the disclosed embodiments.

FIG. 6 illustrates a part 600 of a system consistent with the disclosed embodiments.

The part 600 of the system includes a network on chip 610 that includes an arbitration hardware 612. The arbitration hardware 612 may include K arbitration units 612(1)-612(K), where K is greater than two.

The shared resources are shared memories 620, instruction RAM 603, and boot memory 604. The initiators are CPUs 601, peripherals 602, computer vision processors 60, hardware security module 5606, and sensors interface 607.

There may be other initiators or other shared resources. The shared resources may include computational resources. The access can be made via a network on chip or via any other interconnect or networking element.

The network on chip 610 is coupled to shared memories 620, instruction RAM 603 and boot memory 604, CPUs 601, peripherals 602, computer vision processors 605, hardware security module 606 and sensors interface 607.

The arbitration hardware 612 may manage the access of the initiators, through the network on chip, to the shared resources by applying methods 400 or 401.

Each active initiator of CPUs 601, peripherals 602, computer vision processors 605, hardware security module 606 and sensors interface 607 may be configured to iteratively determine a number of pending access requests generated by the active initiator, wherein each access request is a request to access a shared resource out of the shared resources.

Each active initiator may be configured to iteratively determine a priority level to be assigned to all pending access requests generated by the active initiator, wherein the determining is based on the number of pending access requests generated by the active initiator, a number of active initiators of the multiple initiators, and a number of access requests serviceable by the shared resources.

Arbitration hardware 612 may be configured to iteratively receive, for each active initiator, information about the priority level to be assigned to all pending access requests generated by the active initiator, may update (if required) the priority levels, and may iteratively manage access to the shared resources, based on the priority level to be assigned to all pending access requests generated by each active initiator.

Each active initiator is associated with at least one arbitration unit of 612(1)-612(K)—and the at least one arbitration unit may be configured to iteratively receive the priority level to be assigned to all pending access requests generated by the active initiator.

Each active initiator may be configured to determine the priority level to be assigned to all pending access requests generated by the active initiator by assigning higher priority levels to access requests generated while the active initiator has a lower numbers of pending access requests.

There are a plurality of priority levels (L), and each active initiator may be configured to determine the priority level to be assigned to all pending access requests generated by the active initiator by selecting a priority level out of the plurality of priority levels.

Each active initiator may be configured to determine the priority level by selecting a priority level out of the plurality of priority levels.

Each priority level is associated with a range of numbers of pending access requests, and wherein each active initiator may be configured to determine the priority level to be assigned to all pending access requests generated by the active initiator by searching for a range of values that includes the number of pending access requests generated by the active initiator.

For each priority level (Q) the range of numbers of pending access requests that is associated with the priority level starts by a value that substantially equals $(L-1-Q)*R/M/(L-1)$, wherein R is the number of the access requests serviceable by the shared resources, and wherein M is the number of currently active initiators of the multiple initiators that are currently active.

For each priority level (Q) the range of numbers of pending access requests that is associated with the priority level ends at a value that substantially equals $(L-Q)*R/M/(L-1)-1$.

Figure 7:
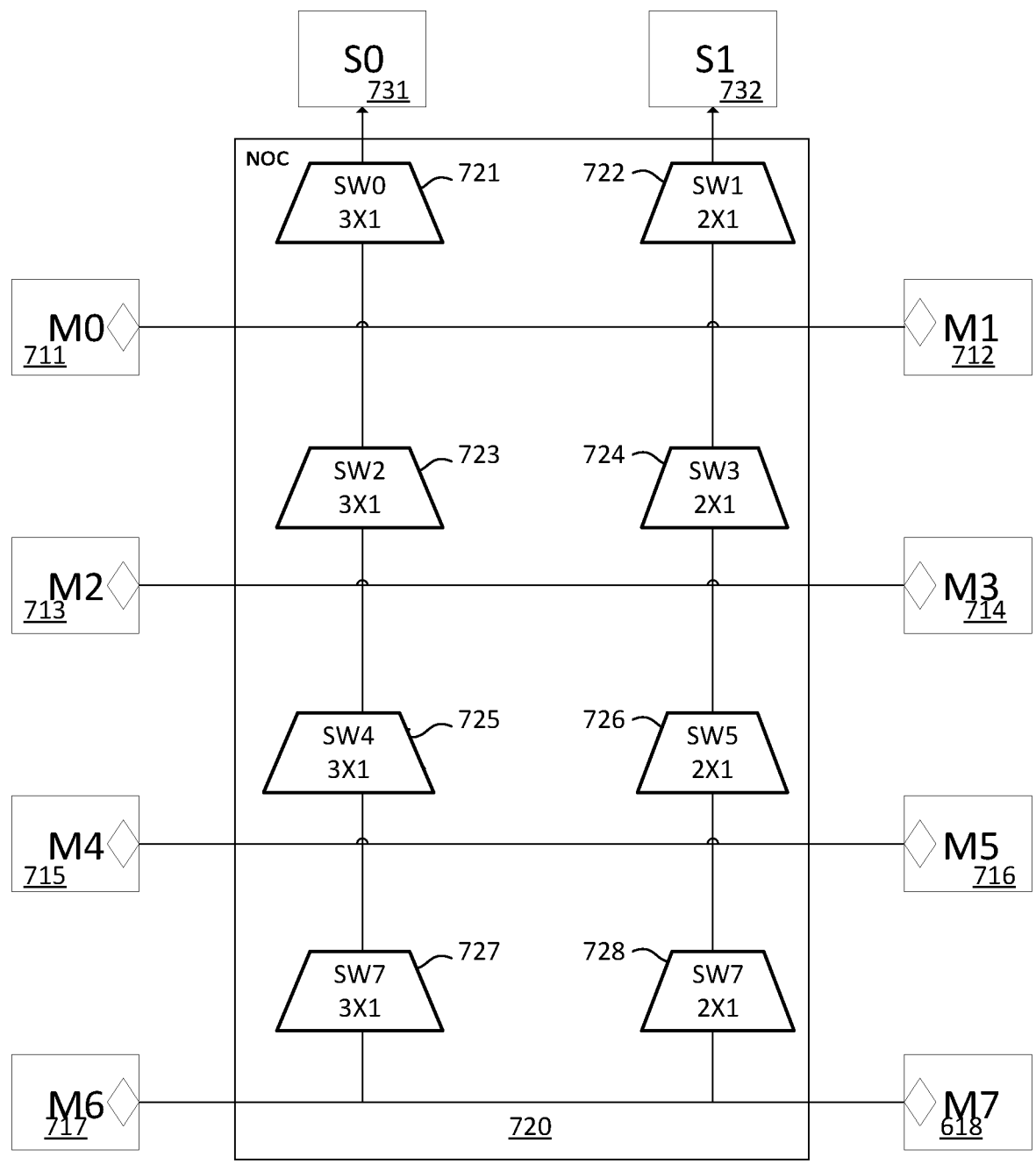
FIG. 7 illustrates a part of a system consistent with the disclosed embodiments.

FIG. 7 illustrates an example of a part the system. FIG. 7, as well as other figures of the application, provide non-limiting examples. For example, the number of switches in FIG. 7, the number of ports per switch, the number of initiators coupled to each switch, and the number of initiators, are merely non-limiting examples.

There are eight initiators M0-M7 711-718, an arbitration hardware 720 that includes eight arbitration units such as eight arbitrating switches SW0-SW7 721-728, and two shared resources S0-S1 731-732.

The arbitrating switches are arranged in two sequences of arbitrating switches. A first sequence includes three-input-one-output (denoted "3×1") switches SW0, SW1, SW2, SW3, SW4, and SW5. A second sequence includes two-input-one-output (denoted "2×1") switches SW6 and SW7. Each arbitrating switch is also coupled to one or more initiator.

Within each sequence, an output of an arbitrating switch (except the last arbitrating switch of the sequence) is coupled to an input of the next arbitrating switch of the sequence.

Arbitrating switches SW0-SW7 721-728 are configured to apply a prioritized round-robin policy (round-robin between initiators with highest priority). Any other priority based arbitrations scheme may be applied.

SW0 721 may be configured to arbitrate between M0 711, M1 712 and SW2 723.

SW2 723 may be configured to arbitrate between M2 713, M3 714 and SW4 725.

SW4 725 may be configured to arbitrate between M4 715, M5 716 and SW6 727.

SW6 727 may be configured to arbitrate between M6 717 and M7 718.

SW1 722 may be configured to arbitrate between M0 711, M1 712 and SW3 724.

SW3 724 may be configured to arbitrate between M2 713, M3 714 and SW5 726.

SW5 726 may be configured to arbitrate between M4 715, M5 716 and SW7 728.

SW7 728 may be configured to arbitrate between M6 717 and M7 718.

Each initiator may be configured to update the arbitration unit associated with the initiator about the current priority of the access requests generated by the initiator. For example, initiator M0 711 may update SW0 721 and SW1 722 and may not update other arbitration switches.

Any reference to a system should be applied, mutatis mutandis to a method that is executed by a system or to a computer program product that stores instructions that once executed by the system will cause the system to execute the method. The computer program product may be non-transitory and may be, for example, an integrated circuit, a magnetic memory, an optical memory, a disk, and the like.

Any reference to method should be applied, mutatis mutandis to a system that may be configured to execute the method or to a computer program product that stores instructions that once executed by the system will cause the system to execute the method.

Any reference to a computer program product should be applied, mutatis mutandis to a method that is executed by a system or a system that may be configured to execute the instructions stored in the computer program product.

The term "and/or" is additionally or alternatively.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

The phrase "may be X" indicates that condition X may be fulfilled. This phrase also suggests that condition X may not be fulfilled. For example—any reference to a system as including a certain component should also cover the scenario in which the system does not include the certain component.

The terms "including", "comprising", and "having", are used in an interchangeable manner. For example, any method may include at least the steps included in the figures or in the specification, or only the steps included in the figures or the specification. The same applies to the system and the mobile computer.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Also, for example, in an embodiment, the illustrated examples may be implemented as circuitry located on a single integrated circuit or within a same device. Alternatively, the examples may be implemented as any number of separate integrated circuits or separate devices interconnected with each other in a suitable manner.

Also, for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Any combination of any component of any component or unit of system that is illustrated in any of the figures or specification or the claims may be provided.

Any combination of any system illustrated in any of the figures or specification or the claims may be provided.

Any combination of steps, operations or methods illustrated in any of the figures or specification or the claims may be provided.

Any combination of operations illustrated in any of the figures or specification or the claims may be provided.

Any combination of methods illustrated in any of the figures or specification or the claims may be provided.

Moreover, while illustrative embodiments have been described herein, the scope of any and all embodiments having equivalent elements, modifications, omissions, combinations (e.g., of aspects across various embodiments), adaptations or alterations as would be appreciated by those skilled in the art based on the present disclosure. The limitations in the claims are to be interpreted broadly based on the language employed in the claims and not limited to examples described in the present specification or during the prosecution of the application. The examples are to be construed as nonexclusive. Furthermore, the steps of the disclosed methods may be modified in any manner, including by reordering steps or inserting or deleting steps. It is intended, therefore, that the specification and examples be considered as illustrative only, with a true scope and spirit being indicated by the following claims and their full scope of equivalents.

What is claimed is:

1. A method for managing access of multiple initiators to shared resources, the method comprises:
   determining, by an active initiator of the multiple initiators, a number of pending access requests generated by the active initiator, wherein each access request is a request to access a shared resource out of the shared resources;
   determining, by the active initiator, a priority level to be assigned to all pending access requests generated by the active initiator, wherein the determining is based on the number of pending access requests generated by the active initiator, a number of active initiators out of the multiple initiators, and a number of access requests serviceable by the shared resource; and
   informing, by the active initiator, an arbitration hardware of a network on chip about the priority level to be assigned to all pending access requests generated by the active initiator, including any access request that was already sent to the arbitration hardware before the determining and already has an existing priority level that differs from the determined priority level, to manage access to the shared resources based on the priority level to be assigned to all pending access requests generated by each active initiator;
   wherein there are a plurality of priority levels (L), and wherein the determining comprising selecting a priority level out of the plurality of priority levels;
   wherein each priority level is associated with a range of numbers of pending access requests, and wherein the determining of the priority level to be assigned to all pending access requests generated by the active initiator comprises searching for a range of values that includes the number of pending access requests generated by the active initiator; and
   wherein for each priority level (Q), the range of numbers of pending access requests that is associated with the priority level starts by a value that equals $(L-1-Q)*R/M/(L-1)$ with a deviation up to 10%, wherein R is the number of the access requests serviceable by the shared resources, and wherein M is the number of currently active initiators of the multiple initiators that are currently active.

2. The method according to claim 1, wherein each active initiator is associated with at least one arbitration unit of the arbitration hardware; and wherein for each active initiator, the informing of the arbitration hardware comprises informing the at least one arbitration unit about the priority level to be assigned to all pending access requests generated by the active initiator.

3. The method according to claim 1, wherein the determining of the priority level to be assigned to all pending access requests generated by the active initiator comprises assigning higher priority levels to access requests generated while the active initiator has a lower numbers of pending access requests.

4. The method according to claim 1, wherein for each priority level (Q) the range of numbers of pending access requests that is associated with the priority level ends at a value that equals $(L-Q)*R/M/(L-1)-1$ with a deviation up to 10%.

5. The method according to claim 1, wherein the multiple initiators and the shared resources belong to an advanced driver assistance system.

6. The method according to claim 1, wherein the multiple initiators and the shared resources belong to an autonomous driving system.

7. A system having access management capabilities, the system comprises:
   shared resources that are configured to service up to a number of access requests;
   multiple initiators that comprises active initiators that are configured to generate access requests for accessing the shared resources; and
   an arbitration hardware;
   wherein each active initiator of the multiple initiators is configured to:
      iteratively determine a number of pending access requests generated by the active initiator, wherein each access request is a request to access a shared resource out of the shared resources;
      iteratively determine a priority level to be assigned to all pending access requests generated by the active initiator, wherein the determining is based on the number of pending access requests generated by the active initiator, a number of active initiators out of the multiple initiators, and a number of access requests serviceable by the shared resource; and iteratively inform the arbitration hardware of a network on chip about the priority level to be assigned to all pending access requests generated by the active initiator, including any access request that was already sent to the arbitration hardware before the determining and already has an existing priority level that differs from the determined priority level;

wherein there are a plurality of priority levels (L), and wherein the determining comprising selecting a priority level out of the plurality of priority levels;

wherein each priority level is associated with a range of numbers of pending access requests, and wherein the determining of the priority level to be assigned to all pending access requests generated by the active initiator comprises searching for a range of values that includes the number of pending access requests generated by the active initiator; and wherein for each priority level (Q), the range of numbers of pending access requests that is associated with the priority level starts by a value that equals $(L-1-Q)*R/M/(L-1)$ with a deviation up to 10%, wherein R is the number of the access requests serviceable by the shared resources, and wherein M is the number of currently active initiators of the multiple initiators that are currently active; wherein the arbitration hardware is configured to:

iteratively receive, for each active initiator, information about the priority level to be assigned to all pending access requests generated by the active initiator; and iteratively manage access to the shared resources, based on the priority level to be assigned to all pending access requests generated by the active initiator.

8. The system according to claim 7, wherein each active initiator is associated with at least one arbitration unit of the arbitration hardware; and wherein each active initiator is configured inform the at least one arbitration unit about the priority level to be assigned to all pending access requests generated by the active initiator.

9. The system according to claim 7, wherein each active initiator is configured to assign higher priority levels to access requests generated while the active initiator has a lower numbers of pending access requests.

10. The system according to claim 7, wherein for each priority level (Q) the range of numbers of pending access requests that is associated with the priority level ends at a value that equals $(L-Q)*R/M/(L-1)-1$ with a deviation up to 10%.

11. The system according to claim 7, wherein the multiple initiators and the shared resources belong to an advanced driver assistance system.

12. A non-transitory computer program product that stores instructions for managing access of multiple initiators to shared resources, the instructions when executed by a system causes the system to perform operations comprising:

determining, by an active initiator of the multiple initiators, a number of pending access requests generated by the active initiator, wherein each access request is a request to access a shared resource out of the shared resources;

determining, by the active initiator, a priority level to be assigned to all pending access requests generated by the active initiator, wherein the determining is based on the number of pending access requests generated by the active initiator, a number of active initiators out of the multiple initiators, and a number of access requests serviceable by the shared resource; and informing, by the active initiator, an arbitration hardware of a network on chip about the priority level to be assigned to all pending access requests generated by the active initiator, including any access request that was already sent to the arbitration hardware before the determining and already has an existing priority level that differs from the determined priority level, to manage access to the shared resources, by the arbitration hardware, based on the priority level to be assigned to all pending access requests generated by the active initiator;

wherein there are a plurality of priority levels (L), and wherein the determining comprising selecting a priority level out of the plurality of priority levels;

wherein each priority level is associated with a range of numbers of pending access requests, and wherein the determining of the priority level to be assigned to all pending access requests generated by the active initiator comprises searching for a range of values that includes the number of pending access requests generated by the active initiator; and wherein for each priority level (Q), the range of numbers of pending access requests that is associated with the priority level starts by a value that equals $(L-1-Q)*R/M/(L-1)$ with a deviation up to 10%, wherein R is the number of the access requests serviceable by the shared resources, and wherein M is the number of currently active initiators of the multiple initiators that are currently active.

13. The non-transitory computer program product according to claim 12, wherein the informing comprises requesting to change the priority level of any access request that was already sent to the arbitration hardware before the determining and already has the existing priority level that differs from the determined priority level.

14. The system according to claim 7, wherein the arbitration hardware is configured to update, during an iteration, the priority level of any access request that was already sent to the arbitration hardware before the determining and already has the existing priority level that differs from the determined priority level.

15. The method according to claim 1, wherein the informing comprises requesting to change the priority level of any access request that was already sent to the arbitration hardware before the determining and already has the existing priority level that differs from the determined priority level.

* * * * *